United States Patent [19]

Cook

[11] 4,392,226
[45] Jul. 5, 1983

[54] MULTIPLE SOURCE CLOCK ENCODED COMMUNICATIONS ERROR DETECTION CIRCUIT

[75] Inventor: Donald M. Cook, Poway, Calif.

[73] Assignee: NCR Corporation, Dayton, Ohio

[21] Appl. No.: 306,118

[22] Filed: Sep. 28, 1981

[51] Int. Cl.³ ............................................. G06F 11/00
[52] U.S. Cl. ..................................... 371/61; 307/269; 371/62; 375/110
[58] Field of Search ..................... 371/61, 62; 307/269; 375/110; 328/63, 72

[56] References Cited

U.S. PATENT DOCUMENTS

| | | | |
|---|---|---|---|
| 3,320,440 | 5/1967 | Reed | 371/62 |
| 3,474,414 | 10/1969 | Lenz | 371/62 |
| 4,012,697 | 3/1977 | Ballinger | 375/110 |
| 4,122,441 | 10/1978 | Robinson et al. | 371/61 |
| 4,144,448 | 3/1979 | Pisciotta et al. | 371/61 |
| 4,222,009 | 9/1980 | Moulton et al. | 375/110 |
| 4,267,595 | 5/1981 | Hernandez | 375/110 |

*Primary Examiner*—Charles E. Atkinson
*Attorney, Agent, or Firm*—J. T. Cavender; Arthur A. Sapelli; Donald P. Gillette

[57] ABSTRACT

This invention relates to an error detection circuit for detecting errors in a recovered clock signal from a self-clocking digital data signal. A first flip-flop is alternately set and reset by the recovered clock signal and by a clock source of supposedly equal frequency, respectively. The output of the first flip-flop is sensed by a second flip-flop at the end of a predetermined time period, as determined by the clock source, for determining that a transition in the recovered clock source occurred within the predetermined time period. If no transition occurred within the predetermined time period, the second flip-flop outputs an error signal.

6 Claims, 6 Drawing Figures

MULTIPLE SOURCE CLOCK ENCODED COMMUNICATIONS ERROR DETECTION CIRCUIT

FIELD OF THE INVENTION

This invention relates to digital data transmitting systems, and more particularly, to error detection circuits of a recovered clock signal from a self-clocking digital data stream.

RELATED PATENT APPLICATION

This invention may be used in a receiver subsystem such as that disclosed in U.S. patent application Ser. No. 217,339, filed Dec. 17, 1980, and now U.S. Pat. No. 4,355,398 issued Oct. 19, 1982, entitled "Real Time Clock Recovery Circuit," by Donald M. Cook, assigned to the same assignee as the present application.

BACKGROUND OF THE INVENTION

In the transmission of a self-clocking digital data stream, it is usually essential to the proper operation of digital apparatus that the clocking signal be correctly extracted. When a derived clock signal is improperly generated from the input self-clocking digital data stream, it is highly desirable to detect such an error as quickly as possible in order to halt the operation of the apparatus and to effect recovery procedures, such as a retransmission of the message. Many techniques have been implemented to detect transmission errors such as parity check or cyclic redundancy check, however, these techniques are more adapted to detection of data errors. Techniques for detecting recovered clock signals errors have been heretofore implemented. Such previous techniques have generally required approximately four bit times or more before an error in the recovered clock can be detected.

SUMMARY OF THE INVENTION

Therefore, there is provided in the present invention, an error detection circuit for detecting an error in a clock signal recovered from a digit data signal. The error detection circuit comprises a first element for detecting a transition in the voltage level of the clock signal, to provide a transition signal indicating whether the transition has occurred. A second element senses the transition signal, to provide an error signal if no transition has occurred within a predetermined time period.

It is therefore an object of the present invention to provide a circuit for more rapidly detecting an error in a clock signal recovered from a self-clocking digital data stream.

It is another object of the present invention to provide a circuit for increasing the probability of detection of an error in a clock signal recovered from the self-clocking digital data stream.

It is still another object of the present invention to provide a circuit for detecting an error in a clock signal recovered from a self-clocking digital data stream within one and one-half bit times.

These and other objects of the present invention will become more apparent when taken in conjunction with the following description and attached drawings, wherein like characters indicate like parts, and which drawings form a part of the present application.

DETAILED DESCRIPTION

In the preferred embodiment, an error detection circuit of the present invention is included in a system interface receiver which forms part of an interface adapter connected between a processor-memory bus and a bit serial link.

Figure 1:
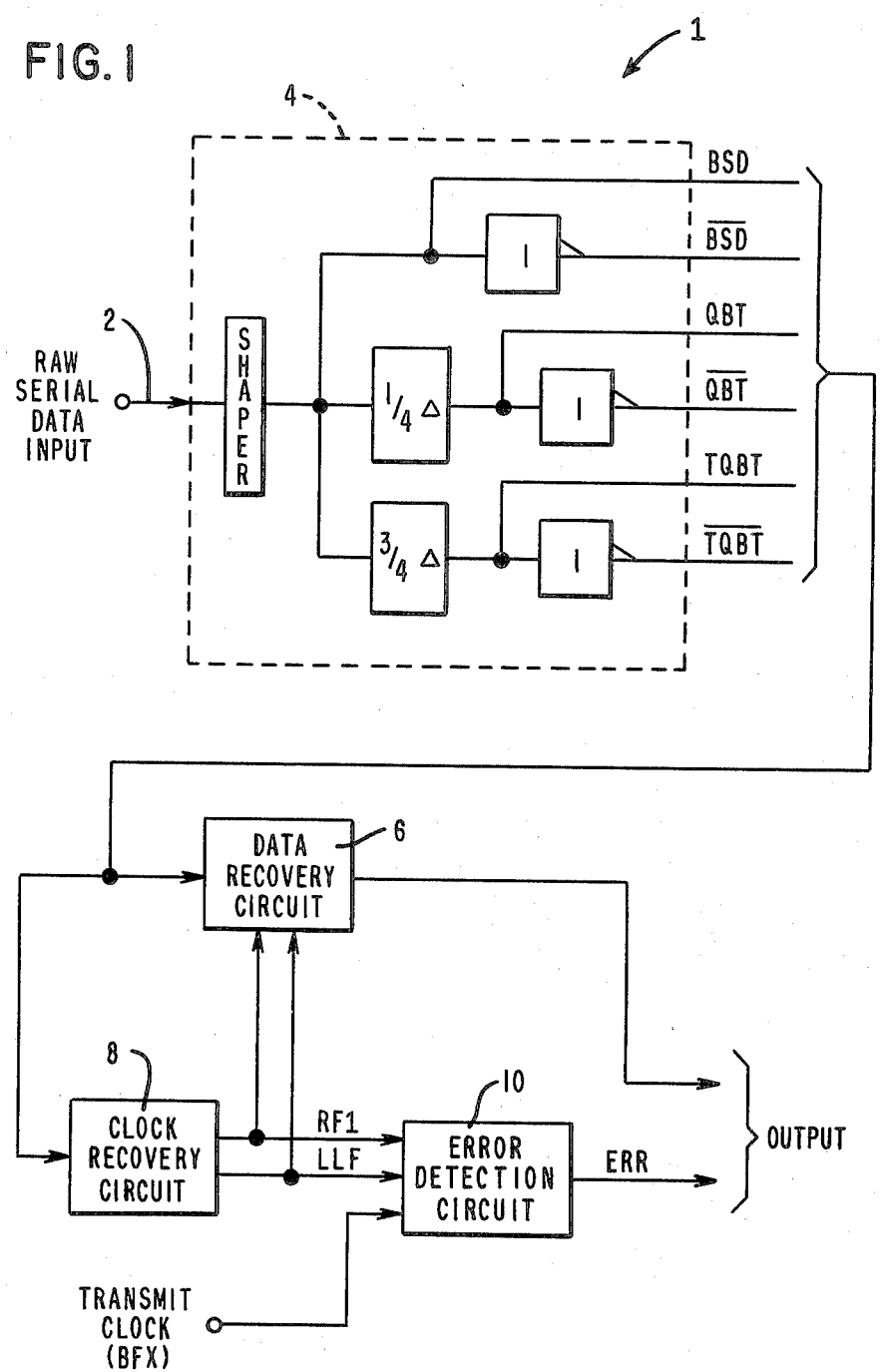
FIG. 1 is a simplified block diagram of a system interface receiver showing the inclusion of an error detection circuit.

Referring to FIG. 1, a system interface receiver 1 is shown. The system interface receiver 1 accepts a raw serial data input signal from an I/O link 2. A signal generator 4 generates three digital signals and their respective complement (or bar) signals. These digital signals are derived from the raw serial data input signal which is a combination of the data and clock signals, the raw serial data signal being of the Manchester encoded or diphase encoded type. The digital signals comprise the bit serial data signal (BSD) which is a demodulated shaped version of the raw serial data input signal using regeneration techniques well-known in the art, the quarter bit time signal (QBT) which is a version of BSD delayed by a quarter of a bit time, the three quarter bit time signal (TQBT) which is a version of BSD delayed by three quarters of the bit time, and the respective complement or inverted signal $\overline{BSD}$, $\overline{QBT}$ and $\overline{TQBT}$. Techniques for generating the digital signals and their respective complement signals are well-known in the art; hence, the signal generator 4 will not be discussed further herein.

These digital data signals are coupled to a data recovery circuit 6 and a clock recovery circuit 8. The data recovery circuit 6 decodes the encoded data to binary, deserializes the data to a byte format, byte aligns, and transmits the byte data to the OUTPUT. The clock recovery circuit 8 recovers the clock signal from the self-clocking digital data input signal. The clock recovery circuit 8 utilized in the system interface receiver 1 is the same as that described in the afore-mentioned U.S. application Ser. No. 217,339, filed Dec. 17, 1980, and now U.S. Pat. No. 4,355,398 issued Oct. 19, 1982, entitled "Real Time Clock Recovery Circuit," by Donald M. Cook, and assigned to the same assignee as the present invention. The disclosure of this previously filed application is incorporated by reference herein to the extent required for an understanding of the present invention. The recovered clock signal RF1 and a data input signal LLF from the clock recovery circuit 8 are coupled to the data recovery circuit 6 and to an error detection circuit 10. The data input signal LLF, which indicates that the self-clocking digital data input signal is still active, will be described in detail hereinunder. A transmit clock signal BFX, inputted to the system interface receiver 1, is also coupled to the error detection circuit. Upon detecting an error, the error detection circuit 10 outputs an error signal, ERR.

Figure 2:
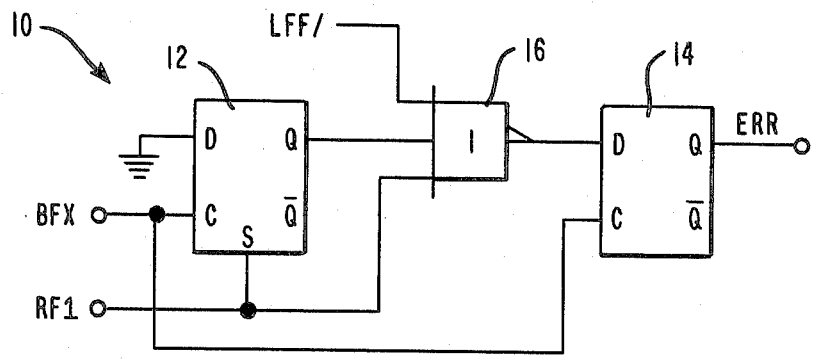
FIG. 2 is a logic diagram of the preferred embodiment of the error detection circuit.

A logic diagram of the error detection circuit 10 of the present invention is shown in FIG. 2. The circuit of the preferred embodiment comprises a first flip-flop 12 and a second flip-flop 14, both flip-flops being D-type flip-flops which are clocked on the falling edges, the operation of D-type flip-flops being well understood by those skilled in the art. Both the first and second flip-flops 12, 14 have the clock input (C) connected to the transmit clock signal (BFX) which is inputted to the system interface receiver. The set input(S) of the first flip-flop 12 is connected to the recovered clock signal (RF1), and the D input is tied to ground or the logic zero level. The Q output, or true output, of the first flip-flop 12 is inputted to a NOR-gate 16. NOR-gate 16 also has an $\overline{LLF}$ signal connected to a second input and the recovered clock signal (RF1) connected to a third input. The output of NOR gate 16 is connected to the D input of the second flip-flop 14. The Q output of flip-flop 14 is the error signal (ERR). When ERR is high, an error in the clock has been detected.

Basically, the error detection circuit 10 samples the recovered clock with respect to the transmit clock. If between two samples the recovered clock signal (RF1) hasn't changed, then an error condition exists. The operation of the error detection circuit 10 compares the recovered clock signal (RF1) to a reference or absolute clock signal (transmit clock BFX), of supposedly equal frequency. If between any two consecutive negative-going transitional edges of the absolute clock source the recovered clock is active and does not have a transition, an error is detected, i.e., the recovered clock period is too long to be valid. Hence, the period of transmit clock (BFX) is the predetermined period in which the recovered clock signal (RF1) is sensed. The absolute clock signal, transmit clock (BFX), used by the error detection circuit 10 is the transmit clocking signal of the system interface transmitter (not shown), which forms part of the interface adapter mentioned above, the various system interface transmitters within the system having their individual transmit clock signals derived from their own crystals which are of substantially equal frequency.

The comparison of the two clocks is essentially done by first flip-flop 12. Transmit clock BFX, input to the clock input of first flip-flop 12, is trying to propagate a low digital signal through to the NOR-gate 16. At the same time, the recovered clock signal RF1 is input to the set terminal of the first flip-flop 12. Thus, first flip-flop 12 is being set and reset by the action of these two clock signals much like a switch. If a clock pulse is missing from the recovered clock, first flip-flop 12 will fail to set. On the next falling edge of the absolute clock source, transmit clock signal BFX, first flip-flop 12 will go low, that is, the Q output of first flip-flop 12 will be low, thus partially qualifying NOR-gate 16. The second input to NOR-gate 16 containing the RF1 signal will likewise be low, still partially qualifying NOR-gate 16. The last input, the $\overline{LLF}$ signal, for qualifying NOR-gate 16 will be low, thereby totally qualifying NOR-gate 16. That will cause in the D input to second flip-flop 14 to be high. On the next trailing edge of the BFX signal, second flip-flop 14 will be set high, causing the error signal ERR to be generated.

Figure 3:
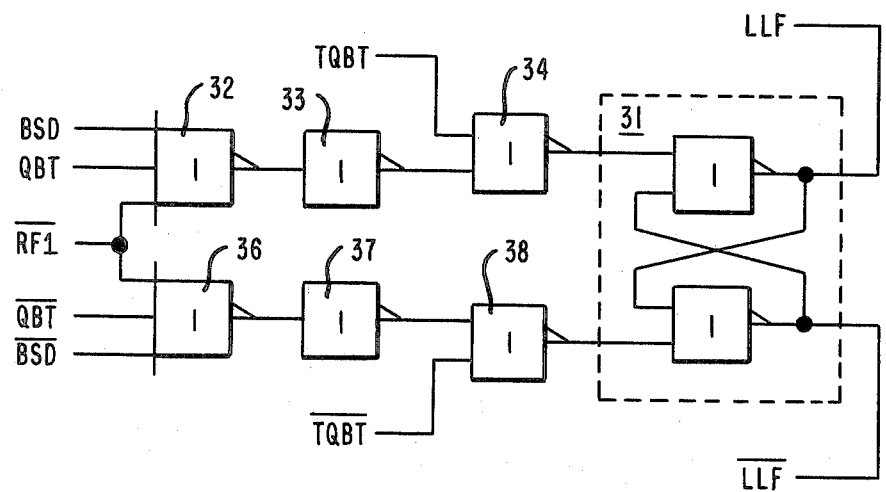
FIG. 3 is a logic diagram of the preferred embodiment of the last low frequency generator circuit utilized in the clock recovery circuit of the system interface receiver.

The LLF signal is derived by the last low frequency generator circuit which is part of the clock recovery circuit 8 and will be described in conjunction with FIG. 3. The last low frequency generator circuit combines the BSD and $\overline{BSD}$ signals with the QBT and TQBT signals and their complement signals simultaneously while the recovered clock, RF1, is a logic one (high). The last low frequency generator circuit of the preferred embodiment is shown in FIG. 3. An LLF latch 31 is set and reset in accordance with the following logic equations:

$$LLF = \overline{RF1} \cdot (BSD \cdot QBT \cdot TQBT)$$

$$\overline{LLF} = \overline{RF1} \cdot (\overline{BSD} \cdot \overline{QBT} \cdot \overline{TQBT})$$

When the signals BSD, QBT are a logic one (high), and RF1 is a logic zero (low), the output of NOR-gate 32 is a logic zero (or low). Inverter 33 will invert the output of NOR-gate 32 resulting in a logic one input to NOR-gate 34. When the TQBT signal is low, the output of NOR-gate 34 is low, the LLF latch 31 being reset, i.e. LLF=0, due to $\overline{LLF}$ being high. At the same time, the $\overline{QBT}$ and $\overline{BSD}$ inputs to NOR-gate 36 are low, the $\overline{RF1}$ signal still is low, which results in the output of NOR-gate 36 being a logic one; hence, the output of inverter 37 and the input to NOR-gate 38 is low. Since TQBT is low, $\overline{TQBT}$ is high, yielding a low output from NOR-gate 38. This results in the output of NOR-gate 38 going high, causing $\overline{LLF}$ to go low and LLF to go high, thereby setting LLF latch 31. As can be seen from the above condition, NOR-gates 32 and 34 together with inverter 33 yield the resultant AND function for the TQBT, QBT and BSD signals for setting LLF latch 31, and NOR-gates 36 and 38 together with inverter 37 give the AND function for the $\overline{TQBT}$, $\overline{QBT}$, and $\overline{BSD}$ signals for resetting the LLF latch 31, the setting and resetting of LLF latch 31 being performed in accordance with the above equations.

Figure 4:
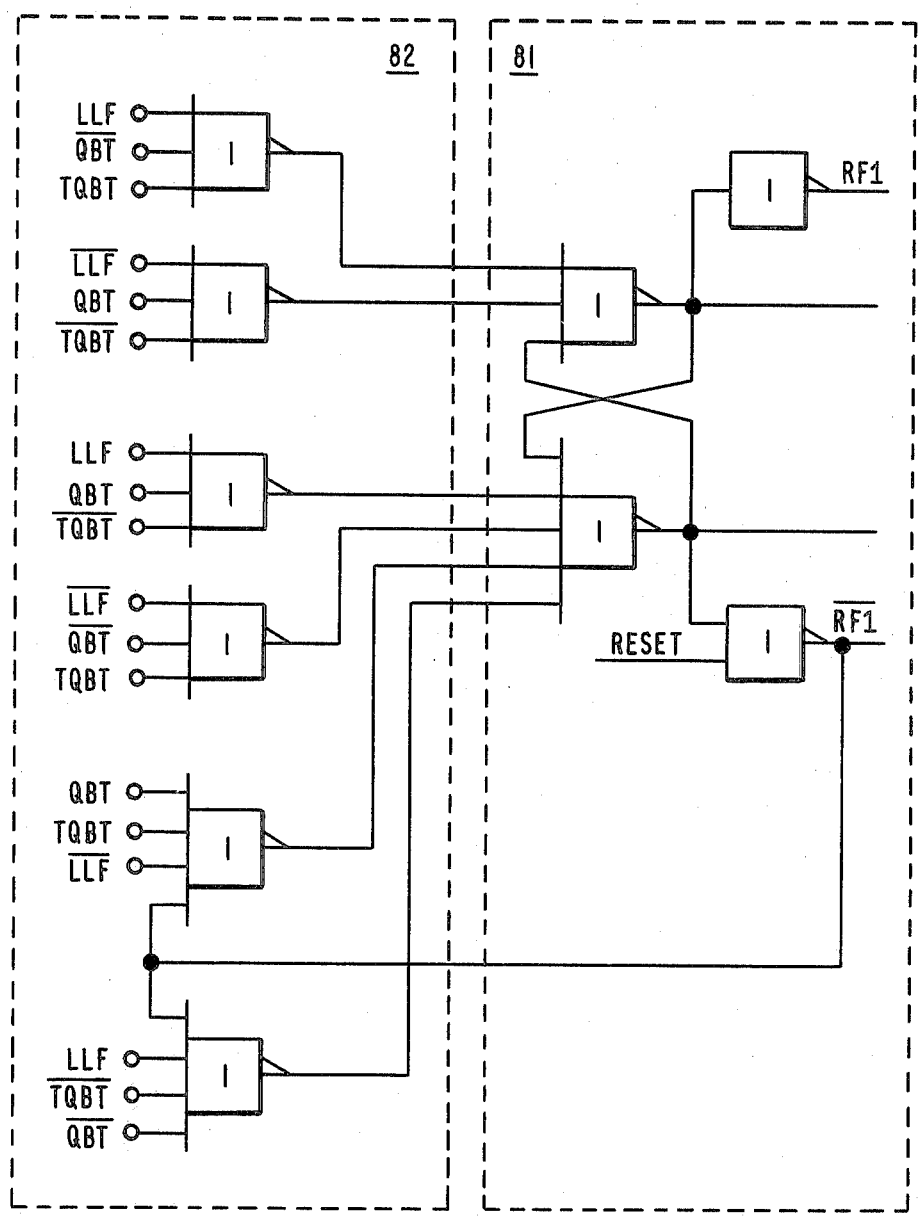
FIG. 4 is a logic diagram of the circuit for the generation of the recovered clock signal.

The recovered clock signal RF1 is generated by the setting and resetting of a latch 81, shown in FIG. 4, in accordance with the logic equations set forth in Table 1.

TABLE 1

| | EQUATION |
|---|---|
| 1. | $RF1 = QBT \cdot \overline{TQBT} \cdot \overline{LLF}$ |
| 2. | $RF1 = \overline{QBT} \cdot TQBT \cdot LLF$ |
| 3. | $\overline{RF1} = \overline{LLF} \cdot TQBT \cdot \overline{QBT}$ |
| 4. | $\overline{RF1} = LLF \cdot \overline{TQBT} \cdot QBT$ |
| 5. | $\overline{RF1} = LLF \cdot \overline{TQBT} \cdot \overline{QBT}$ |
| 6. | $\overline{RF1} = \overline{LLF} \cdot TQBT \cdot QBT$ |

The setting and resetting logic 82 implements set and reset signals defined in Table 1. A more detailed explanation to the operation of the circuit of FIG. 4 may be had by referring to the aforementioned application.

Figure 5:
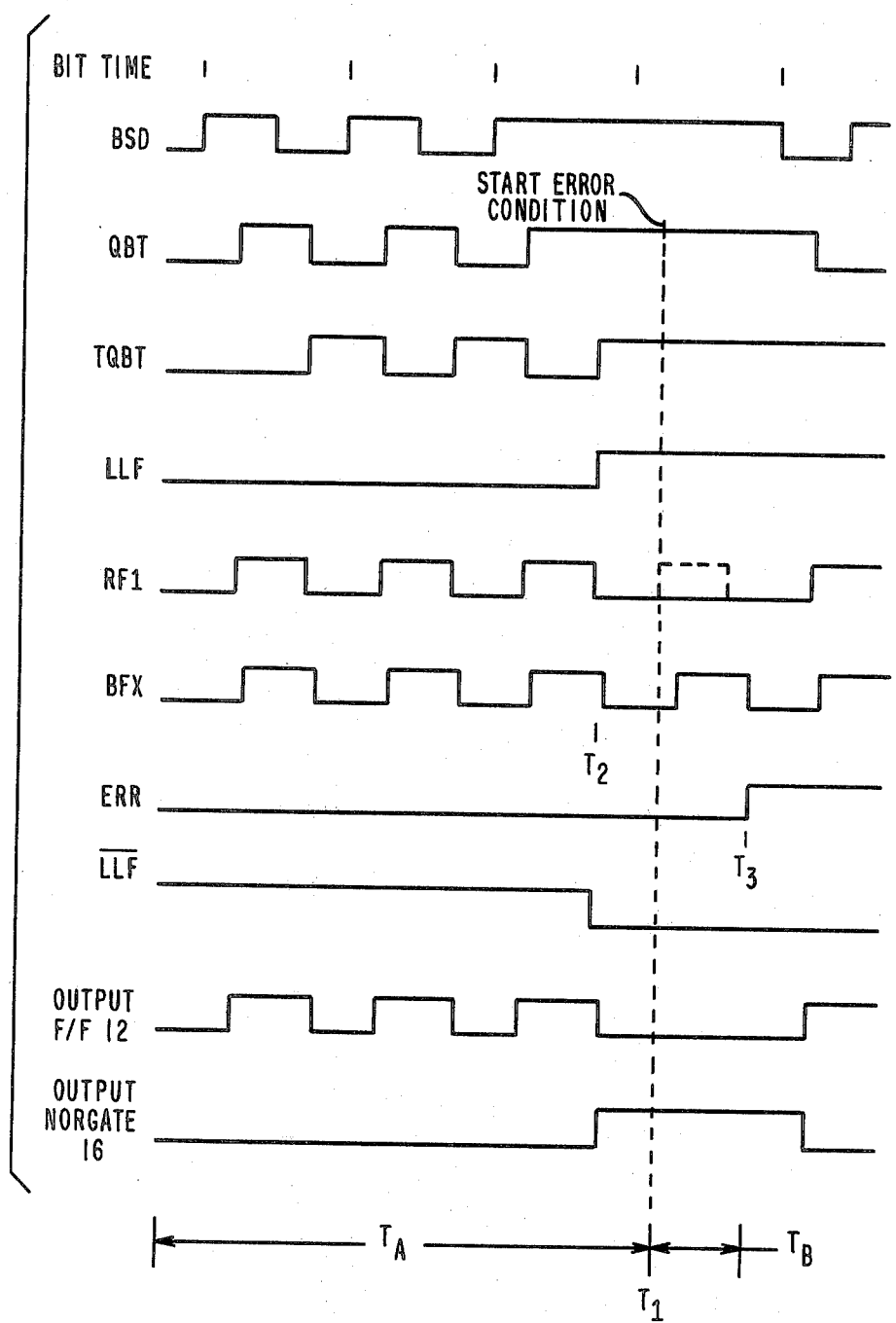
FIG. 5 is a timing diagram of specified signals utilized as an example for showing the detection of an error condition within one-half bit time by the circuit of the present invention.
Figure 6:
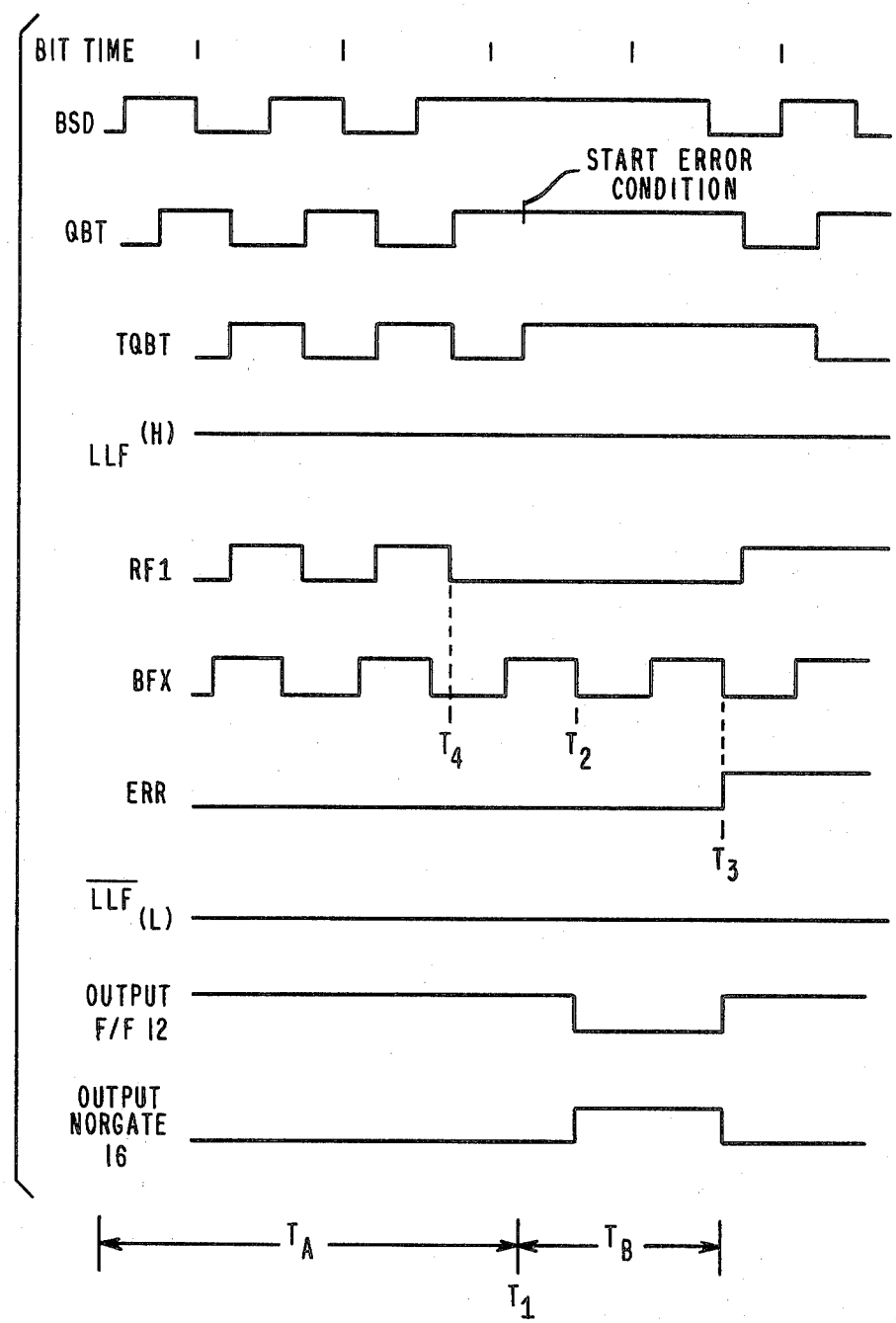
FIG. 6 is a timing diagram of specified signals utilized as an example for showing the detection of an error condition in approximately one and one-half bit time by the circuit of the present invention.

The operation of the error detection circuit 10 may best be understood with the aid of the specific examples shown in FIGS. 5 and 6. Referring to FIG. 5, an example is shown in which one-half bit time elapses before detection of the error. During time interval $T_A$, the system interface receiver is operating normally. FIG. 5 shows the bit times and the bit serial data signal BSD, the QBT, TQBT, and the BFX input signals to the error detection circuit 10. The recovered clock signal RF1 and the generated LLF and $\overline{\text{LLF}}$ signals are also shown. The output signal of second flip-flop 14 (ERR) is also shown along with the output signal of first flip-flop 12 and the output of NOR-gate 16. When RF1 is high, the output of flip-flop 12 is also high. The output of NOR-gate 16 is maintained low through most of the period by $\overline{\text{LLF}}$ input being high, the LLF and $\overline{\text{LLF}}$ signals being generated in accordance with the equations defined above. In this specific example, the error condition starts at time T1, at which time, QBT should be going low. As a result of this error condition, no clock pulses are generated at time T1, that is, RF1 fails to go high at time T1, as shown by the dotted line. Since RF1 is low during the time interval $T_B$, NOR-gate 16 is partially qualified, and the fact that $\overline{\text{LLF}}$ is also low further partially qualifies NOR-gate 16. The output of first flip-flop 12 is low as a result of having been reset by the BFX negative-going signal at time period T2 and has failed to be set because of missing clock pulse RF1. As a result, when the transmit clock BFX goes low at time T3, the D input to second flip-flop 14 is now high causing second flip-flop 14 to set, thereby raising the error signal, ERR, at time T3. The interval of time from the start of the error condition at T1 to the time the error signal ERR is raised at T3 is one-half of a bit time.

Referring to FIG. 6 there is shown an example in which the elapsed time before detection of an error is one and one-half bit times. FIG. 6, like FIG. 5, shows the bit time, the input bit serial data (BSD), QBT, TQBT, and the BFX signals. The generated LLF and $\overline{\text{LLF}}$ signals, along with the RF1 signal are also shown. The output signal of second flip-flop 14 (ERR) is shown along with the output signal of first flip-flop 12 and the output of NOR-gate 16. Still referring to FIG. 6, the error detection circuit 10 is operating normally during time interval $T_A$, as described above. At time period T1, the error condition starts. The output of first flip-flop 12 remains high throughout the period $T_A$. This is because the recovered clock signal is still high holding the first flip-flop 12 set during time period of the falling edge of BFX just prior in time to time period T4. At time period T2, the output of first flip-flop 12 will be reset, since the transmit clock pulse is missing. At time T2, RF1 and $\overline{\text{LLF}}$ are low, partially qualifying NOR-gate 16. Once the output of first flip-flop 12 goes low, NOR-gate 16 is totally qualified, causing the D input to second flip-flop 14 to be high. At time T3, during the falling edge of the BFX signal, the output of second flip-flop 14 will be set, raising the error signal ERR. The period of time from the start of the error condition to detection of the error condition at time T3, time interval $T_B$, is one and one-half bit times. This time interval is the maximum time interval for detection of an error condition for the error detection circuit 10 of the present invention.

It will be understood that the error signal may be outputted directly from the system interface receiver 1 or may be used to set a latch before outputting the error signal to the system. In the latter case, the latch will remain set until the error is recognized and an appropriate recovery action has been taken by the system.

While there has been shown what is considered to be the preferred embodiment of the invention, it will be manifest that many changes and modifications can be made therein without departing from the essential spirit and scope of the invention. It is intended, therefore, in the annexed claims, to cover all such changes and modifications which fall within the true scope of the invention.

I claim:

1. A circuit for detecting an error in a clock signal recovered from a digital data signal comprising:
   (a) means for detecting a transition in the voltage level of the clock signal, said means comprising first switch means clocked at a clock rate equal to that of said recovered clock signal to provide a transition signal indicating whether said transition has occurred;
   (b) gating means to combine an output signal from the clocked switch means with selected parts of said data signal; and
   (c) second switch means clocked at said clock rate and connected to the output of the gating means for sensing the output signal therefrom to provide an error signal if no transition has occurred within a predetermined time period.

2. A circuit for detecting an error in a clock signal recovered from a self-clocking digital data signal comprising:
   (a) means for detecting a transition in the voltage level of the clock signal, said means for detecting comprising a first switch having a first and second state clocked at a clock rate equal to that of said recovered clock signal, said first state indicating the transition has occurred and the second state indicating no transition has occurred;
   (b) gating means to combine an output signal from the clocked switch means with selected parts of said data signal; and
   (c) second switch means clocked at said clocking rate and connected to the output of the gating means for sensing the first and second state of said means for detecting, said means for sensing generating an error signal if the means for detecting fails to reach the first state within a predetermined time period.

3. A circuit for detecting an error in a clock signal recovered from a self-clocking digital data signal comprising:
   (a) means for detecting a transition in the voltage level of the clock signal, said means for detecting having an input terminal adapted to receive a reference clock signal for defining a predetermined time period, and further having an output terminal adapted to transmit a transition signal indicating whether said transition has occurred, wherein said means for detecting comprises:
     i. switch means, for alternating between a first state and a second state in response to the clock signal and the reference clock signal, respectively; and
     ii. gate means, operatively connected to said switch means, for gating the state of said switch means as a function of the clock signal, thereby providing said transition signal; and
   (b) means for sensing said transition signal, said means for sensing operatively connected to said means for detecting, and further operatively connected to the input terminal of said means for detecting, said means for sensing outputting an error signal if no transition has occurred within the predetermined time period.

4. A circuit according to claim 3 wherein said means for sensing comprises a flip-flop having an input operatively connected to said gate means, and having a second input operatively connected to the input terminal of said circuit for receiving the reference clock signal, and further having an output terminal adapted to transmit the error signal for indicating the error in said clock signal.

5. A circuit according to claim 4, wherein said gate means comprises a logic gate having a first, second, and third input and an output, the first input of said logic gate operatively connected to said switch means, the second input of said logic gate adapted to receive the clock signal, the third input of said logic gate adapted to receive a data input signal, and the output terminal of said logic gate operatively connected to said means for sensing.

6. A circuit according to claim 4 or 5, wherein said switch means comprises a flip-flop having an input connected to a logic zero level, and having a second input adapted to receive the reference clock signal, and having a third input adapted to receive the clock signal, and further having an output operatively connected to the output terminal of said switch means.

* * * * *